June 19, 1923.

A. J. HALL ET AL 1,458,935

CONTROL SYSTEM AND APPARATUS

Filed July 30, 1920   3 Sheets-Sheet 1

WITNESSES:
J.A.Helsel
W.R.Coley

INVENTORS
Arthur J. Hall &
Paul L. Mardis.
BY
Wesley G. Carr
ATTORNEY

June 19, 1923.

A. J. HALL ET AL 1,458,935

CONTROL SYSTEM AND APPARATUS

Filed July 30, 1920   3 Sheets-Sheet 3

WITNESSES:
J. A. Helsel
W. R. Coley

INVENTORS
Arthur J. Hall &
Paul L. Mardis.
BY
Wesley G. Carr
ATTORNEY

Patented June 19, 1923.

1,458,935

UNITED STATES PATENT OFFICE.

ARTHUR J. HALL, OF WINCHCOMBE, ENGLAND, AND PAUL L. MARDIS, OF SWISSVALE, PENNSYLVANIA, ASSIGNORS TO WESTINGHOUSE ELECTRIC & MANUFACTURING COMPANY, A CORPORATION OF PENNSYLVANIA.

CONTROL SYSTEM AND APPARATUS.

Application filed July 30, 1920. Serial No. 400,146.

*To all whom it may concern:*

Be it known that we, ARTHUR J. HALL, a subject of the King of Great Britain, and a resident of Winchcombe, England, and PAUL L. MARDIS, a citizen of the United States, and a resident of Swissvale, in the county of Allegheny and State of Pennsylvania, have invented a new and useful Improvement in Control Systems and Apparatus, of which the following is a specification.

Our invention relates to control systems and apparatus and especially to protective means for electric railway systems and the like under abnormal operating conditions.

One object of our invention is to provide a system and apparatus of the above-indicated character wherein a resistor, preferably the starting resistor or resistors of an electric-railway-motor-control system, is gradually inserted in circuit under abnormal voltage or current conditions before the line switch is opened to disconnect the motors from the supply circuit.

More specifically stated, it is an object of our invention to provide a system and apparatus for effecting the desired protective functions in a certain sequence which is inherent by reason of the combination of apparatus used and which does not, therefore, require any special devices, such as time-element relays, etc.

Our invention may best be understood by reference to the accompanying drawings, wherein Figure 1 is a view, in front elevation, of one piece of control apparatus that is employed in carrying out the present invention;

Figure 1:
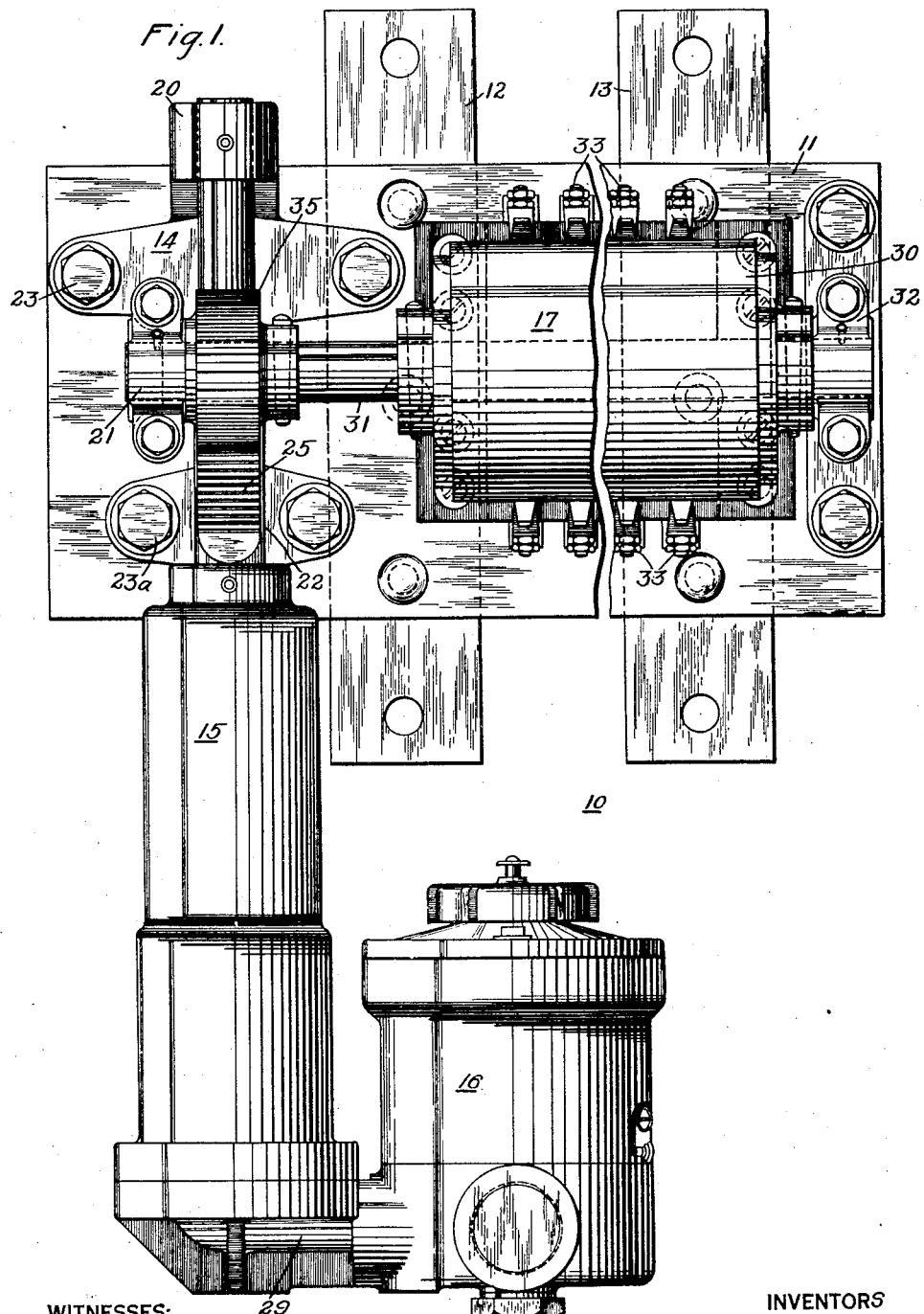
Figure 2:
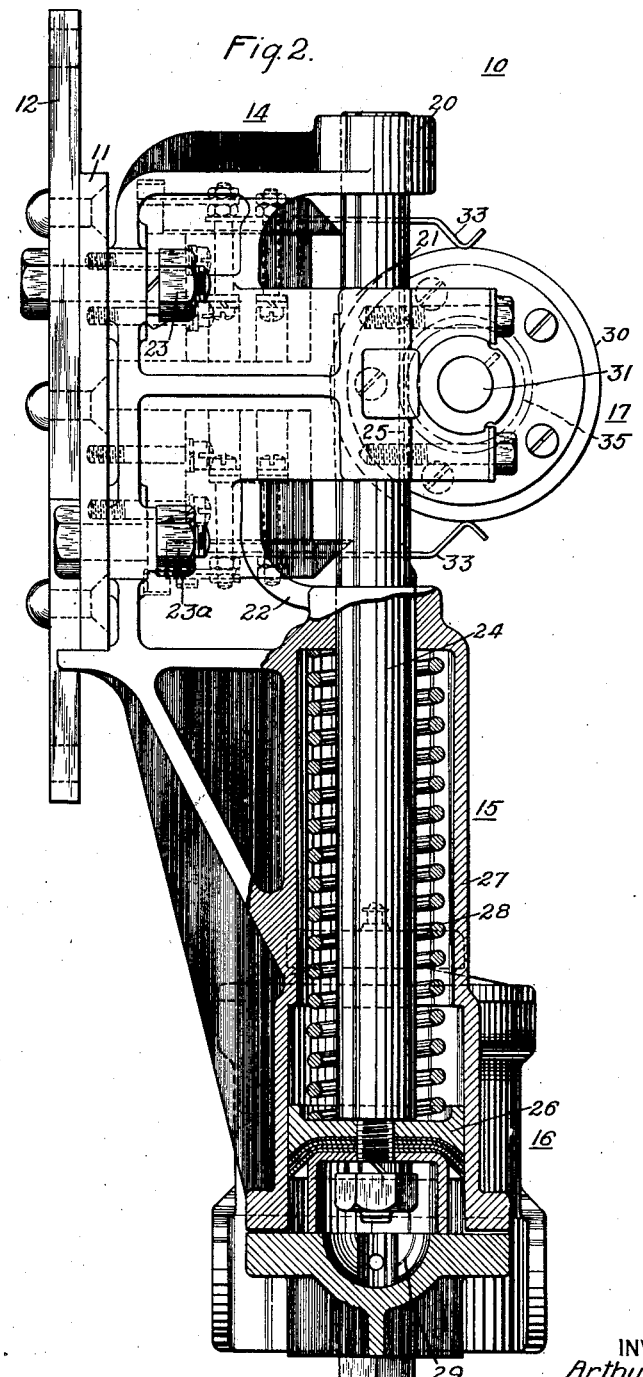
Figure 2 is a view, chiefly in end elevation but partially in section, of the apparatus that is shown in Figure 1.

Referring to Figs. 1 and 2 of the drawings, the apparatus 10 here shown comprises a base member or plate 11 to which is riveted or otherwise suitably secured, a plurality of transversely extending strips or supporting bars 12 and 13, whereby ready mounting in any desired location is afforded; a compound bracket or journal structure 14; a piston-and-cylinder device 15; a controlling electromagnetic valve 16 therefor; and a drum controller 17 that is adapted to be actuated by the piston-and-cylinder device 15.

The bracket structure 14 preferably comprises integrally-related bearing members or journals 20, 21 and 22, the bearing 21 being provided for the drum controller 17 and the other two bearing members for the piston rod 24. The common base or connecting member of the bracket structure 14 is bolted to the main base member 11, as indicated by the reference characters 23 and 23ᵃ, to provide a rigid and suitably positioned support for both the piston-and-cylinder device 15 and the drum controller 17, as will be understood.

The piston-and-cylinder device 15, in addition to the piston rod 24, which is provided with a toothed face or rack portion 25, comprises a suitable piston 26, which is adapted to travel within a cylinder or shell 27 that is preferably integrally associated with the bracket structure 14, as illustrated. A helical spring 28 is located within the cylinder 27 around the piston stem 24 to bias the piston 26 to its illustrated lowermost position, which also corresponds to the "tripped" or normal position of the drum controller 17, as diagrammatically indicated in Fig. 4. A suitable passage or opening 29 is provided between the lower end of the cylinder 27 and the electromagnetic valve device 16, which may be of any well-known form and consequently need not be described here. It will be understood that an actuating coil, designated by the reference character 16ᵃ in Fig. 4, is provided for actuating a valve spindle to admit fluid pressure from any suitable source to the cylinder 27 or to convey such fluid pressure from the cylinder to the atmosphere, in accordance with a familiar practice.

Figure 4:
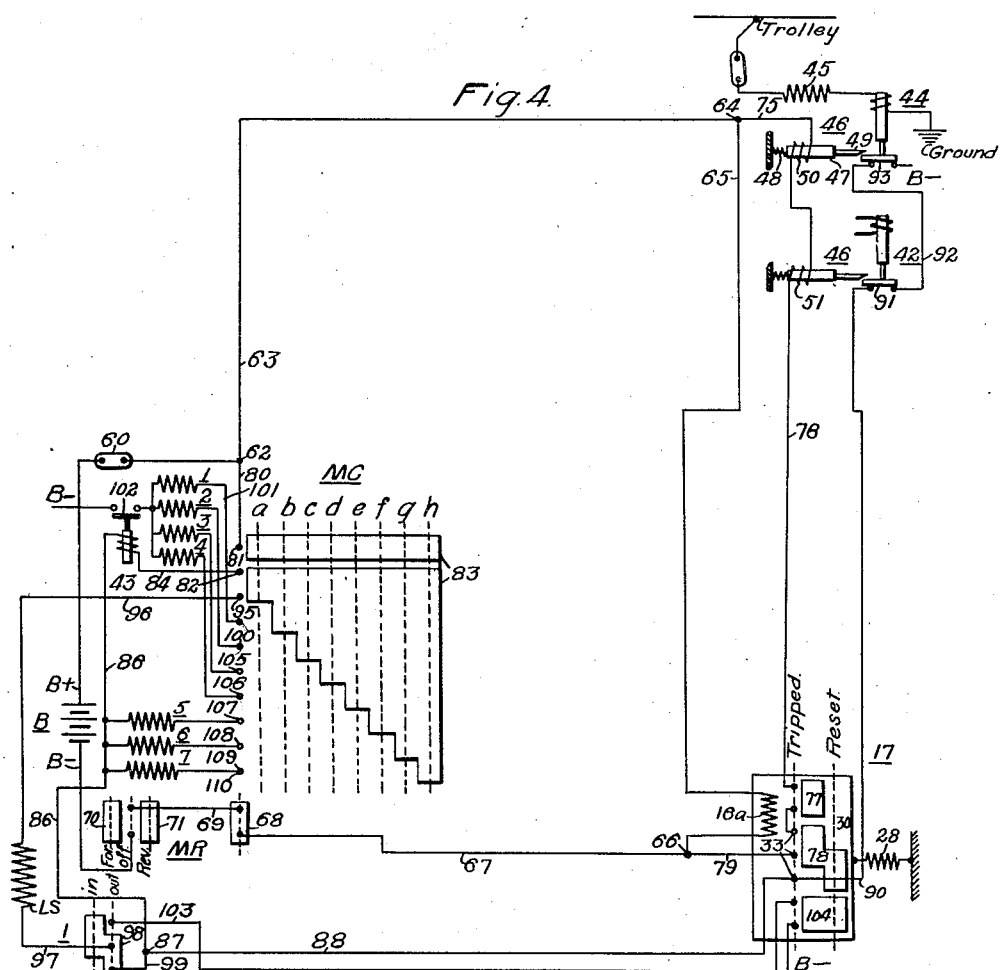
Figure 4 is a diagrammatic view of the auxiliary circuits for applying the above-mentioned protective features to the railway motor that is shown in Fig. 3.

The drum controller 17 comprises a cylinder or drum proper 30, which may be formed of wood or other suitable material for carrying a plurality of contact segments, as is customary (shown in Fig. 4). The drum 30 is rigidly secured to an operating shaft 31, the opposite ends of which are respectively journaled in the bearing member 21 and in a corresponding bearing member 32 at the extreme right-hand end of the base member 11, as viewed in Fig. 1. A suitable member of spring-controlled fingers 33 are provided for completing the desired external circuit connections by means of the above-mentioned contact segments.

Near the bearing member 21, a pinion 35 is rigidly secured to the shaft 31 to mesh with the rack portion 25 of the piston stem 24, as clearly shown in Fig. 1, whereby movement of the piston 26 is directly imparted to the control drum 30.

The operation of the apparatus 10 may be briefly set forth as follows. Upon energization of the actuating coil $16^a$ of the electromagnetic valve 16, fluid pressure is admitted through the passage 29 beneath the piston 26 in the cylinder 27, whereby the piston is raised to its uppermost position in opposition to the action of the biasing spring 28 to correspondingly rotate the control drum 30, through the agency of the rack portion 25 of the piston stem 24 and the meshing pinion 35, whereby the control drum may be actuated from its "tripped" to its "reset" position, as diagrammatically illustrated in Fig. 4.

To effect the return of the control drum 30 and the piston 26 to the illustrated positions, it is merely necessary to de-energize the actuating coil $16^a$, whereupon fluid pressure is exhausted from the cylinder 27 through the valve device 16, and the biasing spring 28 returns the piston 26 and, therefore, the mechanically-connected control drum, to the illustrated normal positions. It will be appreciated that the downward movement of the piston, while quite rapid, is not instantaneous, by reason of the relatively long cylinder 27 that is provided, and this inherent time-element in the apparatus is employed to advantage, as subsequently set forth, for permitting the opening of various electrically-controlled switches during the period of backward movement of the control drum 30.

Figure 3:
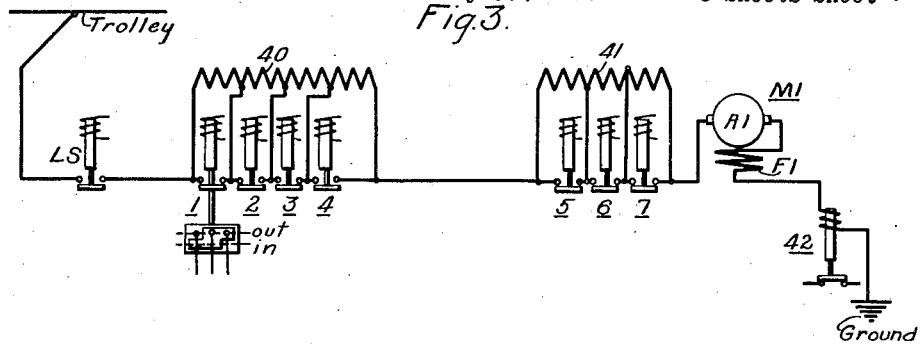
Figure 3 is a diagrammatic view of the main circuits of a system of control to which our invention may be applied.

Referring to Fig. 3, the main circuits here shown comprise supply-circuit conductors Trolley and Ground; a main propelling motor or dynamo-electric machine M1, which is provided with a commutator-type armature A1 and a series field winding F1; a plurality of accelerating or starting resistors 40 and 41, which are respectively controlled by groups of switches 1 to 4, inclusive, and 5 to 7, inclusive; a line switch LS for connecting the motor circuit to the trolley conductor; and an overload or current relay 42 that is employed for a purpose to be described later.

It will be understood that our invention is not restricted to the use of a single motor but that the illustrated system has been made as simple as possible. Furthermore, the various switches, which are illustrated as being of the solenoid or electrically-actuated type, are preferably of the electro-pneumatic form which embodies a piston-and-cylinder device and an electromagnetic valve, such as those designated by 15 and 16, respectively, in Fig. 1 and Fig. 2.

In Fig. 4, the system shown comprises the supply-circuit conductors Trolley and Ground; an excess-voltage relay 44, together with a resistor 45 in circuit therewith across the supply conductors; and a low-voltage auxiliary control system comprising the actuating coils of the switches LS and 1 to 7, inclusive, the controller drum 17, a relay device 43 for a purpose to be set forth, contact members of the overload relay device 42, a master controller MC having operative positions $a$ to $h$, inclusive, and a master reverser MR having the usual "forward," "off" and "reverse" positions, energy being supplied to the various actuating coils from a battery B, for example.

The overload relay 42 and the excess-voltage relay 44 may be of any well-known type for breaking a control circuit under abnormal conditions. As is customary with such devices, a latching or resetting apparatus 46 is provided in connection with each relay to prevent the return of the relay to the closed-circuit position after it has once been operated. In this way, the train operator is forced to return the master controller to its "off" position before the relay devices 42 and 44 may be reset in the illustrated closed position. Each of the latching devices 46 is shown in a simple manner as comprising a magnetizable core 47 which is biased to the illustrated position through the agency of a spring 48 to hold a tapered rod 49 in a position that is suitable for supporting the corresponding relay in its upper or tripped position. By energizing the actuating coils 50 and 51 of the relays 44 and 42, respectively, the latching members 49 may be withdrawn from beneath the relay devices, which thereupon drop to their illustrated closed positions to complete the control circuit until abnormal conditions again obtain.

Assuming that the master controller occupies its illustrated "off" position and that the battery switch 60 has been closed, a circuit is established from the positive battery conductor B+ through switch 60, junction-point 62, conductor 63, junction-point 64, conductor 65, actuating coil $16a$ of the tripping apparatus or control device 10, junction-point 66, conductor 67, contact segment 68 of the master controller in its "off" position, conductor 69, contact segment 70 or 71 of the master reverser, dependent upon whether the reverser occupies its "forward"

or its "reverse" position, whence circuit is completed through the negative conductor B— to the battery B.

The energization of the actuating coil 16a causes the drum controller 17 to be actuated to its "reset" position in opposition to the action of the spring 28.

During such movement of the controller, another circuit is continued from the junction-point 64 through conductor 75, actuating coils 50 and 51 of the latching or resetting apparatus 46 for the relays 44 and 42, respectively, conductor 76, contact segments 77 and 78, which are bridged by certain of the control fingers 33 in positions between the initial or "tripped" position and the final or "reset" position, circuit being continued from the contact segment 78 through conductor 79 to the negatively-connected conductor 67.

In the "reset" position of the drum controller 17, the circuit of the actuating coil 16a is transferred through another portion of the contact segment 78, conductor 90, contact disc 91 of the overload relay 42, conductor 92, contact disc 93 of the excess-voltage relay 44 to the negative conductor B—. In this way, the actuating coil 16a remains energized to maintain the drum controller 17 in its "reset" position after the master controller has been actuated to an operative position, thereby interrupting the previously traced circuit at the contact segment 68.

By actuating the master controller to its initial operation position a, a new circuit is established from the junction-point 62 through conductor 80, control fingers 81 and 82, which are bridged by contact segment 83 of the master controller, conductor 84, actuating coil of the relay device 43, conductor 86, junction-point 87 and conductor 88 to conductor 90, whence circuit is completed to the negative conductor B—, as already traced.

Another circuit is established, at this time, from the contact segment 83 through control finger 95, conductor 96, actuating coil of the line switch LS, conductor 97, contact segment or electrical interlock 98 of the switch 1 (in accordance with the familiar construction diagrammatically illustrated in Fig. 3), whence circuit is continued through conductor 99 and junction-point 87, as mentioned above.

The closure of the line switch connects the motor M1 in series relation with the starting resistors 40 and 41 across the supply-circuit conductors, as will be evident from an inspection of Fig. 3.

Upon movement of the master controller to its second operative position b, a new circuit is established from the contact segment 83 through control finger 100, conductor 101, actuating coil of the switch 1, contact disc 102 of the relay device 43 in its upper or energized position, and thence directly to the negative conductor B—.

Upon the closure of switch 1, the energizing circuit containing the actuating coil of the line switch LS is transferred to another circuit by reason of the movement of the electrical interlock 98 on the switch 1. This new circuit is established from the actuating coil in question through conductor 97, electrical interlock 98, conductor 103, contact segment 104 of the drum controller 17 and thence to the negative conductor B—. The purpose of this transfer of circuits will be pointed out later.

In a manner similar to that previously described, movement of the master controller to position c, d and e effects engagement between the contact segment 83 and control fingers 105, 106 and 107, respectively, whereby the actuating coils of the switches 2, 3 and 4 are successively energized (in parallel relation to the actuating coil for switch 1) to cause the closure of these switches and thus exclude from circuit additional sections of the starting resistor 40 to cause an increased speed of the motor M1.

In positions f, g and h of the master controller, control fingers 108, 109 and 110 respectively engage contact segment 83, whereby the actuating coils for the switches 5, 6 and 7 are successively energized, these coils being connected to the conductor 86. In this way, the starting resistor 41 is gradually excluded from circuit to produce the full series connection of the motor M1 across the supply circuit.

It should be noted that the actuating coils for the switches 1 to 4, inclusive, are connected through the contact disc of the relay device 102 directly to negative conductor B—, whereas the actuating coils for the switches 5, 6 and 7 and for the relay 43 are connected to conductor 86. In this way, it is ensured that, upon the de-energization of the common conductor 86 for these actuating coils, the preferably electro-pneumatic switches 5, 6 and 7 will open prior to the switches 1, 2, 3 and 4 by reason of the inherent time-element required for the normal opening of the magnetic type tripping relay 43, which causes the switches 1 to 4, inclusive, to be de-energized and opened a fraction of a second later.

The emergency operation of the illustrated system may be set forth as follows. If the master controller occupies its final position h, for example, when the overload relay 42 or the excess-voltage relay 44 is actuated to its upper or open-circuit position, the subsequent de-energization of negative conductor 86 instantaneously causes the switches 5 to 7, inclusive, to open a short time prior to the de-energization of the actuating coils for the switches 1 to 4, inclusive, because of the inherently slow opening of the relay 43.

Consequently, the accelerating resistor 41 is immediately inserted in circuit under abnormal conditions, and the accelerating resistor 40 is also inserted in circuit a fraction of a second later.

It will be noted that the actuation of either of the relays 42 and 44 to its open-circuit position also de-energizes the actuating coil 16a of the apparatus 10, which is, therefore, returned to its illustrated "tripped" position by reason of the action of the biasing spring 28. However, as previously described, a relatively great time-element is inherently required for this action as compared with the opening of the resistor-short-circuiting switches 1 to 7, inclusive, so that all of these switches have been opened in the above-mentioned sequence before the drum controller 17 reaches its "tripped" position.

The actuation of the overload relay 42 or excess-voltage relay 44 does not directly affect the energization of the line-switch actuating coil, since the circuit thereof is governed by the drum controller 17. However, as soon as the resistor switch 1 has opened (thus ensuring the maximum circuit resistance) to cause the electrical interlock 98 to occupy the illustrated position, the actuating coil of the line switch is again connected with the circuit containing the contact discs of the relays 42 and 44 or, in other words, is de-energized. On the other hand, this de-energization does not occur until after the resistor switch 1 has dropped out, since the contact segment 104 on the drum controller 17 is made of sufficient length to maintain the energization of the actuating coil during the movement of the controller until sufficient time has elapsed to permit the switch 1 to open. In other words, upon the occurrence of abnormal current or voltage conditions, our system is so organized that first one starting resistor and then the other is inserted in circuit and finally the line switch is opened to disconnect the motor from the supply circuit. In this way, a highly desirable and gradually applied protective feature is inherently provided by our system without the use of special time-element relay devices or the like in connection with any of the switches.

It will be understood that a similar action, in so far as is possible, occurs whenever the master controller occupies some other operative position and either of the relays 42 and 44 is actuated to its upper position.

We do not wish to be restricted to the specific structural details, circuit connections or arrangement of parts herein set forth, as various modifications thereof may be effected within the spirit and scope of our invention. We desire, therefore, that only such limitations shall be imposed thereon as are indicated in the appended claims.

We claim as our invention:

1. The combination with a dynamo-electric machine and a plurality of resistors in circuit therewith, of a plurality of switching devices for said resistors, a switch for controlling the machine circuit, and means responsive to certain machine conditions for successively opening said switching devices and said switch.

2. The combination with a supply circuit and a dynamo-electric machine, of a plurality of resistors in circuit with said machine, a plurality of switching devices for said resistors, a switch for controlling the connection of said machine to said supply circuit, and means responsive to certain machine conditions for opening said switching devices and said switch in successive steps.

3. The combination with a dynamo-electric machine and a plurality of resistors in circuit therewith, of a plurality of resistor-short-circuiting switches, a line switch, and means responsive to certain machine conditions for opening said switches in a predetermined sequence to successively increase the machine-circuit resistance.

4. The combination with a dynamo-electric machine and a plurality of resistors in circuit therewith, of a plurality of resistor-short-circuiting switches, a relay device for controlling one of said switches, means responsive to certain machine conditions for directly affecting the opening of said relay and of another switch, and means co-operating with said responsive means whereby said switches are opened in a predetermined sequence.

5. The combination with a dynamo-electric machine, of a circuit therefor, a plurality of switching means for varying the resistance of said circuit, a relay device governing one of said means, means responsive to certain machine-circuit conditions for effecting the substantially simultaneous opening of said relay and one of said switching means, and means co-operating with said responsive means whereby a certain time element elapses between the opening of said switching means.

6. The combination with a dynamo-electric machine, and a plurality of resistors in circuit therewith, of a plurality of switches for said resistors, a line switch, a relay for governing one of the resistor switches, a rotatable switching device for governing said line switch, and means for substantially simultaneously de-energizing one of said switches and said relay and starting said switching device towards another position, whereby it is ensured that the various switches open in a predetermined sequence.

7. The combination with a dynamo-electric machine, and a plurality of resistors in circuit therewith, of a plurality of switches for said resistors, a line switch, a relay for governing one of the resistor switches, an electrically-controlled rotatable switching device for governing said line switch, and means for substantially simultaneously de-energizing one of said switches, said relay and said switching device to cause the various switches to open in a predetermined order.

8. The combination with a dynamo-electric machine, and a plurality of resistors in circuit therewith, of a plurality of resistor-short-circuiting switches and a line switch, all provided with actuating coils, a relay for governing the coil of one of the resistor switches, a control drum for governing the coil of said line switch and itself having an actuating coil, means for substantially simultaneously de-energizing said relay, the coil of the non-corresponding resistor switch, and the coil for said drum, and means co-operating with the last-named means whereby the resistor switches and the line switch open in a predetermined sequence.

9. The combination with a dynamo-electric machine and a plurality of controlling switches therefor, of a relay for governing one of said switches, a rotatable control device for governing another switch, and means responsive to certain machine conditions for effecting the successive opening of one of said switches, of the switch governed by said relay and of the switch governed by said device.

10. The combination with a dynamo-electric machine and a plurality of controlling switches therefor, of a relay for governing one of said switches, a rotatable control device for governing another switch, said switches and said control device having actuating coils, means for substantially simultaneously de-energizing said relay, the coil of a non-corresponding switch, and the coil of said device, and means co-operating with the last-named means whereby the various switches open in a predetermined sequence.

11. The combination with a dynamo-electric machine, of a plurality of resistor-short-circuiting switches, a line switch, a relay responsive to certain abnormal conditions and adapted to initially govern the actuating circuit of said line switch, and means for subsequently transferring the opening control of said circuit to another switch.

12. The combination with a dynamo-electric machine, of a plurality of resistor-short-circuiting switches, a line switch, an abnormal-condition relay adapted to permanently govern the actuating circuit of a resistor switch and to initially form a part of the actuating circuit of said line switch, and means for subsequently transferring the opening control of the last-named circuit to said resistor switch.

13. The combination with a dynamo-electric machine, of a plurality of resistor-short-circuiting switches, a line switch, an abnormal-condition relay adapted to permanently govern the actuating circuit of a resistor switch and to initially form a part of the actuating circuit of said line switch, a control drum also governed by said relay, and means for transferring the opening control of the last-named circuit jointly to said resistor switch and said drum.

In testimony whereof, I, ARTHUR J. HALL, have hereunto subscribed my name this ninth day of July, 1920.

ARTHUR J. HALL.

In testimony whereof, I, PAUL L. MARDIS, have hereunto subscribed my name this 15th day of June, 1920.

PAUL L. MARDIS.